United States Patent
Guzik et al.

(10) Patent No.: US 11,706,381 B2
(45) Date of Patent: Jul. 18, 2023

(54) SELECTIVE OBFUSCATION OF OBJECTS IN MEDIA CONTENT

(71) Applicants: Getac Technology Corporation, Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Technology Corporation, New Taipei (TW); WHP Workflow Solutions, Inc., North Charleston, SC (US)

( * ) Notice: Subject to any disclaimer, the term of this patent is extended or adjusted under 35 U.S.C. 154(b) by 40 days.

(21) Appl. No.: 17/328,804

(22) Filed: May 24, 2021

(65) Prior Publication Data

US 2022/0377277 A1    Nov. 24, 2022

(51) Int. Cl.
| | |
|---|---|
| *H04N 5/91* | (2006.01) |
| *G06T 7/70* | (2017.01) |
| *G06T 5/00* | (2006.01) |
| *H04N 7/18* | (2006.01) |
| *G06V 20/00* | (2022.01) |
| *G06V 40/10* | (2022.01) |

(52) U.S. Cl.
CPC ............ *H04N 5/91* (2013.01); *G06T 5/002* (2013.01); *G06T 7/70* (2017.01); *G06V 20/00* (2022.01); *G06V 40/10* (2022.01); *H04N 7/18* (2013.01); *G06T 2207/10016* (2013.01); *G06T 2207/30232* (2013.01); *G06T 2207/30248* (2013.01)

(58) Field of Classification Search
None
See application file for complete search history.

(56) References Cited

U.S. PATENT DOCUMENTS

| | | | |
|---|---|---|---|
| 10,311,446 B2 | 6/2019 | Prehofer et al. | |
| 10,824,897 B1* | 11/2020 | Cao | ............................ H04L 9/36 |
| 11,423,467 B2* | 8/2022 | Bronicki | ............ G06Q 30/0635 |
| 2009/0025063 A1* | 1/2009 | Thomas | .............. G06F 21/6218 |
| | | | 726/4 |
| 2009/0251545 A1* | 10/2009 | Shekarri | ................ G06Q 10/00 |
| | | | 348/158 |

(Continued)

OTHER PUBLICATIONS

Lightweight Collaborative Semantic Scheme for Generating an Obfuscated Region to Ensure Location Privacy. Le et al. (Year: 2018).*

(Continued)

*Primary Examiner* — Delomia L Gilliard
(74) *Attorney, Agent, or Firm* — Han Santos, PLLC

(57) ABSTRACT

Described herein are techniques that may be used to provide for automatic obfuscation of one or more objects in a media data. Such techniques may comprise receiving, from a data source, a media data comprising a depiction of a number of objects, identifying, within the received media data, a set of objects associated with the media data, and storing an indication of one or more locations of the objects in the set of objects within the media data with respect to time. Upon receiving a request for the media data, such techniques may further comprise updating the media data by applying an obfuscation effect to the one or more locations with respect to time, and providing the updated media data in response to the request.

20 Claims, 7 Drawing Sheets

(56) References Cited

U.S. PATENT DOCUMENTS

| | | |
|---|---|---|
| 2015/0096002 A1* | 4/2015 | Shuart .................... G06F 21/32 |
| | | 726/7 |
| 2016/0171244 A1 | 6/2016 | Ur et al. |
| 2016/0218872 A1 | 7/2016 | Anderson |
| 2016/0365974 A1 | 12/2016 | Cardno et al. |
| 2017/0243329 A1* | 8/2017 | Ra ............................ G06T 7/73 |
| 2018/0268240 A1* | 9/2018 | Loce .................. G06F 21/6245 |
| 2019/0188830 A1* | 6/2019 | Edwards ................ G06T 5/002 |
| 2019/0373210 A1* | 12/2019 | Nguyen ................. G06V 20/59 |
| 2019/0377901 A1* | 12/2019 | Balzer ................ H04L 63/0421 |
| 2019/0392194 A1 | 12/2019 | Croxford et al. |
| 2020/0005615 A1* | 1/2020 | Madden ........... G08B 13/19684 |
| 2020/0020356 A1* | 1/2020 | Smith .................... H04N 5/772 |
| 2020/0042837 A1* | 2/2020 | Skinner ................ G06V 10/764 |
| 2020/0064956 A1* | 2/2020 | Khoo .................. G06F 21/6245 |
| 2020/0264940 A1* | 8/2020 | Guereca-Pinuelas ... G06F 9/542 |
| 2021/0004486 A1* | 1/2021 | Adams .................. G06F 21/604 |
| 2021/0051294 A1* | 2/2021 | Roedel ................ G06F 21/6245 |
| 2021/0158047 A1* | 5/2021 | Tanner ................ G06F 16/7837 |
| 2021/0182429 A1* | 6/2021 | Chen ....................... H04L 51/10 |

OTHER PUBLICATIONS

International Patent Application No. PCT/US2022/029288, International Search Report and Written Opinion dated Sep. 7, 2022, 9 pages.

\* cited by examiner

| | ID 404 | Incident # 406 | Role 408 | First Name | Last Name |
|---|---|---|---|---|---|
| 402 | 432560 | 16-142066 | Victim | Jane | Doe |
| | 432561 | 16-142066 | Victim | John | Doe |
| | 432563 | 16-142066 | Suspect | Paul | Badd |

FIG. 4

SELECTIVE OBFUSCATION OF OBJECTS IN MEDIA CONTENT

BACKGROUND

In recent years, a number of events have highlighted the need for increased recordkeeping for law enforcement officers. This need pertains to both evidentiary collection as well as protecting the public from potential abuses by a law enforcement officer and protecting the law enforcement officer from false accusations of abuse. Law enforcement has previously used various camera devices, such as patrol vehicle cameras and body mounted cameras, as a means of reducing liability and documenting evidence.

The Freedom of Information Act (FOIA) is a federal law that allows users to request information from any government agency. Analogous laws have been implemented in some states. When a FOIA request is received by a law enforcement agency, such a request may require all information related to a particular event. However, in responding to such a request, law enforcement agencies and other organizations must still comply with various laws and regulations that govern privacy of individuals.

SUMMARY

Techniques are provided herein for providing automatic obfuscation of one or more objects identified within media content (e.g., an image or video). Such techniques may be performed on media data (e.g., audio data, video data, still images, etc.) received from a number of data sources (e.g., public cameras, body-mounted cameras utilized by law enforcement, vehicle-mounted cameras, etc.) to automatically obfuscate objects within that media data.

In one embodiment, a method is disclosed as being performed by a media obfuscation platform, the method comprising receiving, from a data source, a media data comprising a depiction of a number of objects, identifying, within the media data, a set of objects associated with the media data, storing an indication of one or more locations of the objects in the set of objects within the media data with respect to time, receiving a request for the media data, updating the media data by applying an obfuscation effect to the one or more locations with respect to time, and providing the updated media data in response to the request.

An embodiment is directed to a computing device comprising: a processor; and a memory including instructions that, when executed with the processor, cause the computing device to receive, from a data source, a media data comprising a depiction of a number of objects, identify, within the media data, a set of objects associated with the media data, store an indication of one or more locations of the objects in the set of objects within the media data with respect to time, receive a request for the media data, update the media data by applying an obfuscation effect to the one or more locations with respect to time, and provide the updated media data in response to the request.

An embodiment is directed to a non-transitory computer-readable media collectively storing computer-executable instructions that upon execution cause one or more computing devices to perform acts comprising receiving, from a data source, a media data comprising a depiction of a number of objects, identifying, within the media data, a set of objects associated with the media data, storing an indication of one or more locations of the objects in the set of objects within the media data with respect to time, receiving a request for the media data, updating the media data by applying an obfuscation effect to the one or more locations with respect to time, and providing the updated media data in response to the request.

Embodiments of the disclosure provide several advantages over conventional techniques. For example, embodiments of the proposed system provide for automatic obfuscation of objects within media data. Systems in which manual obfuscation of objects in media content (e.g., by an administrator) is performed can be very expensive from a resource perspective, requiring extensive review of each media data to be obfuscated. This is especially true when the media data is lengthy and needs to be reviewed several times. Embodiments of the current system remove this requirement, freeing up valuable resources.

The foregoing, together with other features and embodiments, will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 4 depicts an illustrative example of a listing of objects that may be maintained with respect to a media data in accordance with at least some embodiments

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Described herein are techniques that may be used to automatically identify and obfuscate objects within media data. Such techniques may be applied to various types of media data received from a number of external data sources. In some embodiments, one or more object recognition techniques may be used to identify and track objects depicted within the media data. Information about the identified objects (e.g., times and corresponding locations) may be stored with respect to a particular media data.

Upon receiving a request for information about the media data (e.g., via a FOIA request), an obfuscation process may be performed. To do this, a determination may be made as to which objects should be obfuscated and which objects should remain unobfuscated, i.e., in the clear. In some embodiments, such a determination may be made based on a role or the requesting entity, a role of the object (with respect to the media data or an event), a geographic location associated with the media data, or any other suitable factor. For each object determined to require obfuscation, an obfuscation effect may be applied at times and locations at which that object is depicted within the media data.

Once an obfuscation effect has been applied to the media data, the media data may be encoded (e.g., using a codec) to prevent the obfuscation effect from being removed. The obfuscated media data may then be provided to the requesting entity in response to the received request.

Figure 1:
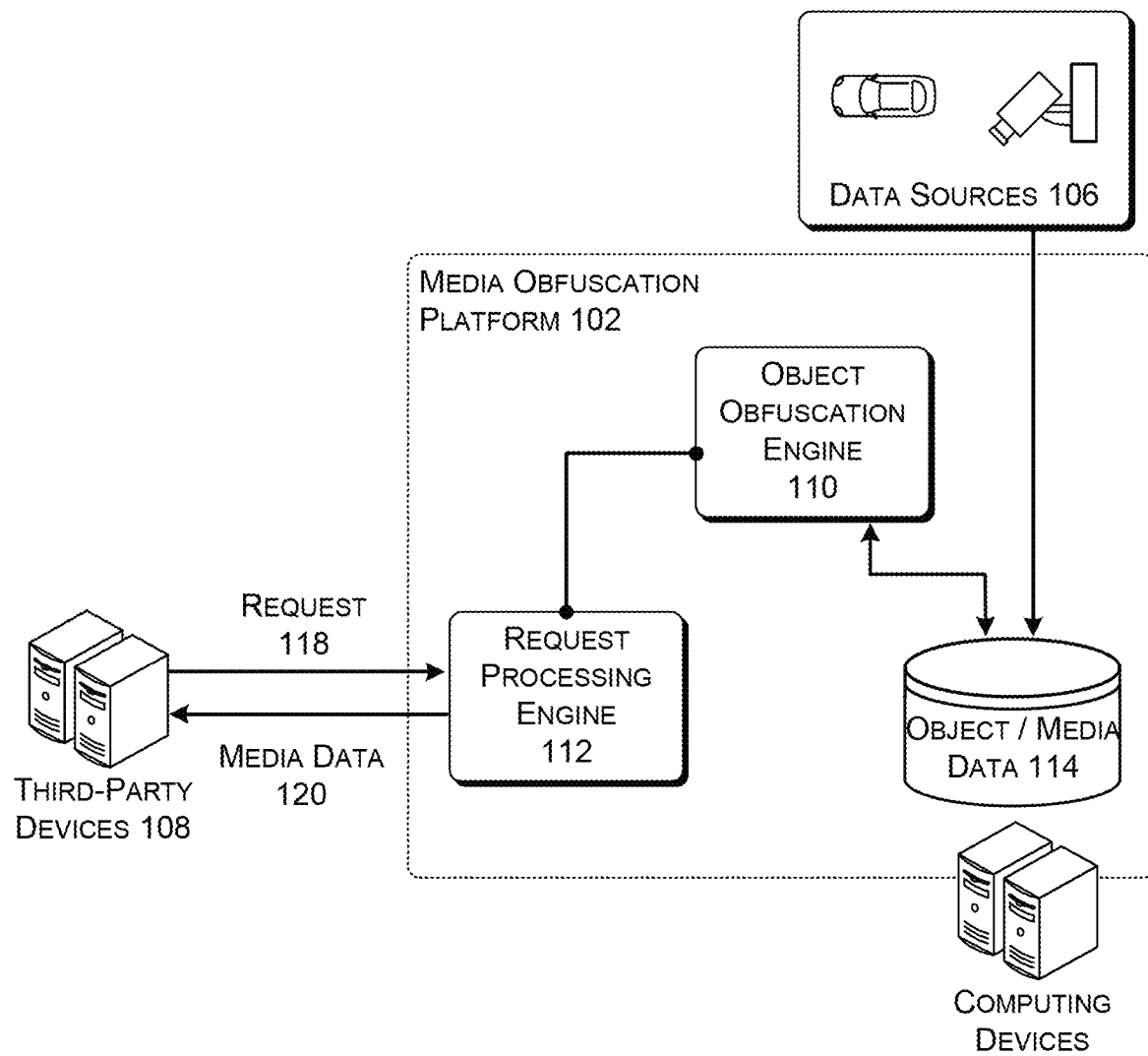
FIG. 1 illustrates a computing environment configured to provide automated obfuscation of objects within media content in accordance with at least some embodiments

FIG. 1 illustrates a computing environment configured to provide automated obfuscation of objects within media content in accordance with at least some embodiments. In the computing environment depicted in FIG. 1, a media obfuscation platform 102 is depicted in communication with a number of electronic device components, such as one or more independent data sources 106, and one or more third-party devices 108.

The media obfuscation platform 102 can include any computing device configured to perform at least a portion of the operations described herein. Media obfuscation platform 102 may be composed of one or more general purpose computers, specialized server computers (including, by way of example, PC (personal computer) servers, UNIX™ servers, mid-range servers, mainframe computers, rack-mounted servers, etc.), server farms, server clusters, or any other appropriate arrangement and/or combination. Service provider computer 108 can include one or more virtual machines running virtual operating systems, or other computing architectures involving virtualization such as one or more flexible pools of logical storage devices that can be virtualized to maintain virtual storage devices for the computer.

The media obfuscation platform 102 may maintain a number of components, including an object obfuscation engine 110 capable of identifying and obfuscating objects identified within media content as well as a request processing engine 112 capable of receiving and responding to requests for media data. In some embodiments, the object obfuscation engine 110 may maintain access to a database of information related to one or more identified objects and corresponding media (e.g., object/media data 114).

In some embodiments, the object obfuscation engine 110 may be configured to identify a number of objects depicted within a video or image using one or more object recognition techniques. The object obfuscation engine 110 then determines which of the identified objects should, or should not, be obfuscated within the media data. In some embodiments, such a determination may be made based on an identity of an entity from which the request was received. Once a determination is made to obfuscate a particular object depicted in the media data, the object may be tracked within the media data with respect to time. One or more obfuscation techniques (e.g., blurring) may be used to obfuscate the tracked object.

A data source 106 may comprise any suitable electronic device capable of being used to record information about a person and/or vehicle's surroundings. In some cases, the recording device may be a camera mounted within a vehicle. In some cases, the recording device may be a device that is capable of being worn or otherwise mounted or fastened to a person. The data source 106 may include at least one input device, such as a microphone or camera, and a number of sensors capable of obtaining data about an environment in which the recording device is located. In some examples, such data sources may include wearable recording devices, vehicle-mounted recording devices, private security network devices, public network cameras, or any other suitable data collection device. Each of the data sources 106 may be configured to collect a variety of media information, such as images, audio, and/or video. In some embodiments, one or more of the data sources may be operated by an entity unaffiliated with the media obfuscation platform 102. In some embodiments, the data sources may have a number of sensors that include a temperature sensor, a real-time clock (RTC), an inertial measurement unit (IMU), or any other suitable sensor. An IMU may be any electronic device that measures and reports a body's specific force, angular rate, and sometimes the orientation of the body, using a combination of accelerometers, gyroscopes, and magnetometers.

In some embodiments, the computing environment may be in communication with one or more third-party computing devices 108. A third-party computing device may be a computing device operated on behalf of an entity unaffiliated with the media obfuscation platform. In some embodiments, the third-party computing device may submit a request 118 to the media obfuscation platform for media data related to an event. In some embodiments, such a request may be a request that complies with a law or legal requirement granting information access rights (e.g., the Freedom of Information Act). Upon receiving a request from a third-party computing device for media data related to such an event, the media obfuscation platform may identify any relevant media data, obfuscate one or more objects depicted within the media data, and provide such media data 120 to the third-party device with access to that that event data.

For purposes of illustrating interactions between one or more of the components of the computing environment, consider an example in which video data (i.e., media data) is received from one or more data sources, such as a street camera or an officer's body-mounted camera. The video data may be associated with an event, such as an event generated in association with a request submitted for emergency services. In some embodiments, the media obfuscation platform may use object recognition techniques to identify and classify objects detected within the video. At a subsequent date/time, a request may be received for information related to the event. Such a request may be received from a third-party entity that is unaffiliated with the media obfuscation platform. Upon receiving the request, the media obfuscation platform may obscure one or more objects within the video and reencode the obscured video. The video with obscured objects is then provided to the entity from which the request was received.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
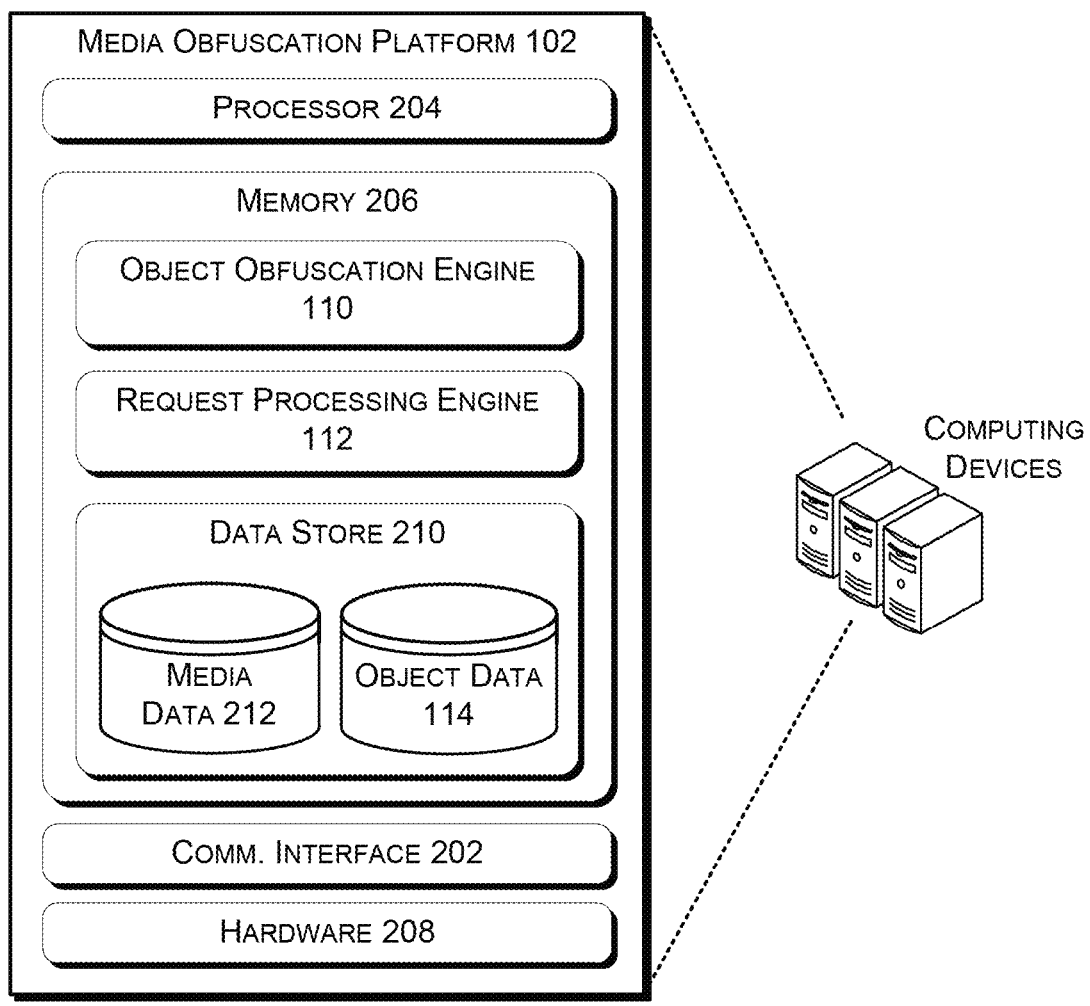
FIG. 2 is a block diagram showing various components of a computing system architecture that supports obfuscation of objects within media data in accordance with some embodiments

FIG. 2 is a block diagram showing various components of a computing system architecture that supports obfuscation of objects within media data in accordance with some embodiments. The system architecture 200 may include a media obfuscation platform 102 that comprises one or more computing devices. The media obfuscation platform 102 may include a communication interface 202, one or more processors 204, memory 206, and hardware 208. The communication interface 202 may include wireless and/or wired communication components that enable the media obfuscation platform 102 to transmit data to, and receive data from, other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The media obfuscation platform 102 can include any computing device or combination of computing devices configured to perform at least a portion of the operations described herein. The media obfuscation platform 102 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The media obfuscation platform 102 can include one or more virtual machines running virtual operating systems, or other computing architectures involving virtualization such as one or more flexible pools of logical storage devices that can be virtualized to maintain virtual storage devices for the computer. For example, the media obfuscation platform 102 may include virtual computing devices in the form of virtual machines or software containers that are hosted in a cloud.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 204 and the memory 206 of the media obfuscation platform 102 may implement functionality from one or more software modules and data stores. Such software modules may include routines, program instructions, objects, and/or data structures that are executed by the processors 204 to perform particular tasks or implement particular data types. The memory 206 may include at least a module for identifying, tracking, and obfuscating objects within media data (e.g., object obfuscation engine 110) as well as a module for receiving and responding to requests (e.g., request processing engine 112). Additionally, the memory 206 may further include a data store 210 that contains a number of database tables or other data storage schemas. The data store 210 may include at least a database of media data received from various data sources (media data 212) and a database of objects detected with respect to the media data.

The object obfuscation engine 110 may be configured to, in conjunction with the processor 204, identify one or more objects depicted within a media file (e.g., a video file). In some embodiments, the identified objects may be classified and/or tracked in that a location of the object within the media file may be indicated with respect to time. For example, multiple objects may be identified as being depicted within a particular media file. In this example, an identifier may be stored for each object as well as an indication of a series of locations (e.g., within a graphical user interface presentation) at which the respective object is depicted at a corresponding series of times. In such embodiments, an object may be identified using one or more object recognition algorithms, such as a facial recognition algorithm, a pattern recognition algorithm, a template matching algorithm, and/or so forth. In some instances, the object recognition algorithms may implement the use of machine-learning models. Further, the identified object may be tracked across multiple video frames of video data using a video tracking algorithm. For example, the video tracking algorithm may include a kernel-based tracking function that performs an iterative localization procedure based on the maximization of a similarity measure for the video frames. Alternatively, or concurrently, the video tracking algorithm may include a contour tracking function that detects object contour boundaries and iteratively evolves an initial contour from a previously video frame to its new position in a current video frame.

The request processing engine 112 may be configured to, in conjunction with the processor 204, respond to a request received from a third-party computing device. In some embodiments, the request processing engine may retrieve media data that has been obfuscated to protect the privacy of more or more individuals associated with the media. In some cases, the request processing engine 112 may be configured to perform additional processing on the media data. For example, before responding to a request for media data related to a particular event, the request processing engine 112 may be configured to call the object obfuscation engine 110 in order to obfuscate images of innocent (or at least non-relevant) parties within a video file. In some embodiments, the request processing engine 112 may provide a data file to the requesting entity that includes a separate copy of any obfuscated media data. In other embodiments, the request processing engine 112 may provide the requesting entity with a link (or other suitable location reference) that the requesting entity can use to access the obfuscated media data.

The communication interface 202 may include wireless and/or wired communication components that enable the media obfuscation platform to transmit or receive data via a network, such as the Internet, to a number of other electronic devices (e.g., data source 106). Such a communication interface 202 may include access to both wired and wireless communication mechanisms. In some cases, the media obfuscation platform transmits data to other electronic devices over a long-range communication channel, such as a data communication channel that uses a mobile communications standard (e.g., long-term evolution (LTE)).

Figure 3:
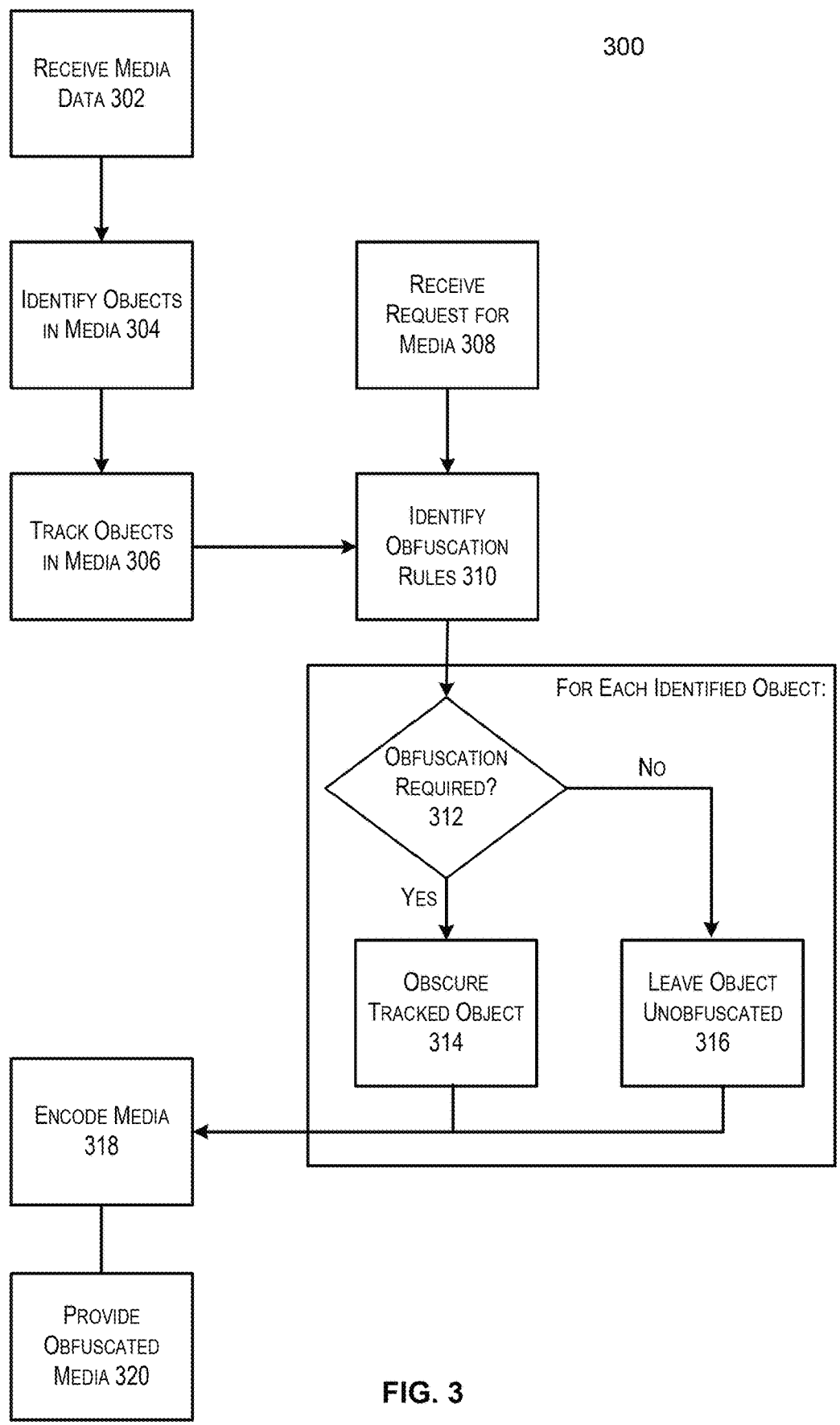
FIG. 3 depicts a block diagram showing an example process flow for correlating media data with events in accordance with embodiments

FIG. 3 depicts a block diagram showing an example process flow for correlating media data with events in accordance with embodiments. The process 300 involves interactions between various components of the architecture 100 described with respect to FIG. 1. More particularly, the process 300 involves interactions between at least a media obfuscation platform 102, at least one data source 106, and one or more third-party devices 108.

At 302 of the process 300, media data is received from one or more data sources. Such data sources may include street cameras, body-mounted recording devices, vehicle-mounted cameras, or any other suitable recording device in communication with a media obfuscation platform. The received media data may include videos, images, and/or audio data.

At 304 of the process 300, one or more objects may be identified as being depicted within the media data. In some embodiments, this may involve the use of one or more object recognition techniques to identify and classify objects depicted within the media data. In some cases, the object may be classified as belonging to a broad category of object. In some cases, the object may be classified as being a particular object. By way of illustration, in some cases an object may be identified as being a person whereas in other cases the object may be identified as being a particular person (e.g., using facial recognition). In some embodiments, trained machine learning models may be used to perform object recognition. In at least some of these embodiments, a first trained machine learning model may be used to determine a broad category into which the object belongs and a second trained machine learning model may be used to determine a specific type/identity of the object within the broad category.

At 306 of the process 300, the one or more identified objects may be tracked throughout the media data. For example, for each object identified in the media data, a series of locations and times associated with that object may be stored. In this example, each of the series of locations and times may correspond to a frame in a video (where the media data is a video). In some embodiments, such as when the media data is a still image, the object may be associated with a single location within the media data. In some embodiments, each of the identified objects is assigned a role based on information stored in relation to the media data. For example, a number of people may be depicted in a video that relates to a crime that was committed. With respect to that crime in this example, some of the people may be assigned a role as a bystander, some of the people may be assigned a role as a victim, and some of the people may be assigned a role as a suspect.

At 308 of the process 300, at a time subsequent to receiving the media data at 302, a request may be received for information related to a particular object (e.g., a particular person) or related to a particular event or incident. Upon receiving the request, the request may be categorized based on a type of the received request and/or a role of the entity from which the request was received (e.g., reporter, prosecutor, defense attorney, etc.). Upon receiving such a request, one or more media data associated with that request may be retrieved from a data store.

At 310 of the process 300, one or more obfuscation rules may be determined. In some embodiments, such obfuscation rules may be received from a user (e.g., via the request for media at 308). For example, the user may be presented with an indication of each of the objects that have been identified within the media data and may be provided the ability to select whether at least a portion of those objects are obfuscated within the media data that is to be provided in response to the request. In some embodiments, a number of rules may be maintained by a media obfuscation platform that provide for automatic obfuscation of one or more objects based on a role of the requesting entity and/or a role of an object with respect to the media data. For example, one rule may dictate that if the requesting entity is a member of the public that is not in law enforcement, then any person (i.e., an object) that is not a suspect (e.g., a victim or a bystander) should be obfuscated automatically.

An obfuscation process may then be performed for each of the objects identified with respect to a media data. In some embodiments, a role or category for each object in the media may also be identified. At 312, a determination may be made with respect to each of the identified objects as to whether the respective object should be obfuscated. In some embodiments, such a determination may be made based on an identified role of the object with respect to the media. For example, all objects that are identified as people may be categorized as victims, bystanders, or suspects. In this example, objects identified as victims or bystanders may be obfuscated whereas all objects identified as suspects may remain unobfuscated. Additionally, one or more rules may be maintained that dictate circumstances under which a number of non-people objects (e.g., drivers' licenses, vehicle license plates, addresses, etc.) should be obfuscated. In some embodiments, a determination as to whether a particular object should be obfuscated may be made based on a selection received from a user (e.g., an administrator or the requesting entity).

Upon a determination being made to obfuscate an identified object (e.g., "Yes" from decision block 312), the respective object may be obfuscated at 314. In some cases, this comprises creating an obfuscation effect at a location associated with the identified object. Such an obfuscation effect may be any suitable effect that can obfuscate the object. Examples of a suitable obfuscation effects may include blur effects such as stack blur, gaussian blur, motion blur, box blur, radial blur, or heavy radial blur effects. Other examples of obfuscation effects may include pixilation, of the object, replacing the object with another image (black bar, dot, etc.), or otherwise distorting the object at the location. Upon a determination being made not to obfuscate an identified object (e.g., "No" from decision block 312), no further action may be taken with respect to that object at 316.

At 318 of the process 300, once an obfuscation effect has been added to the media data for each of the objects to be obfuscated, the media data may be encoded at 318. In some embodiments, this is done using a codec (e.g., a video codec) that is configured to compress the media data that includes the obfuscation effects. For example, a video codec may be used to compress an altered video data into a format that conforms to a standard video coding format. Compressing the media data in this manner can prevent a downstream user from removing an applied obfuscation effect from the obfuscated objects. Once the media data has been encoded, that media data is then provided to the requesting entity at 320.

FIG. 4 depicts an illustrative example of a listing of objects that may be maintained with respect to a media data in accordance with at least some embodiments. Upon receiving a media data from a data source, one or more object recognition techniques may be used to identify a number of objects 402 that are depicted throughout that media.

Each of the number of objects 402 may be assigned an identifier 404 that can be used identify that object. In some embodiments, such an identifier may comprise an identifier that correlates the object within other media data received by a media obfuscation platform. For example, the media obfuscation platform may maintain a set of information for each object identified within various media data that it receives. In some embodiments, a determination may be made during an object recognition process that characteristics associated with an identified object match characteristics associated with an object that has previously been identified in relation to another media data. The identified object may then be assigned the identifier of the object previously identified in relation to the other media data.

In some embodiments, a media data may be associated with one or more events or incidents 406. In some embodiments, such an event may correspond to a case file maintained by a law enforcement agency or a medical care provider. In such cases, a request submitted to the media obfuscation platform for information may be submitted in relation to a specified event. The media obfuscation platform then identifies and performs obfuscation techniques with respect to each of the media data that relate to the specified event.

In some embodiments, each of the identified objects may be assigned a role 408. In some embodiments, an object's role may be specific to a particular media data and/or a particular incident. For example, an object identified within both a first media data and a second media data may be associated with a first role with respect to the first media data and a second role with respect to the second media data. By way of illustration, a person identified within both a first video and a second video may be assigned a role as a suspect in the first video and a role as a bystander in the second video. In embodiments in which an object is assigned a particular role with respect to a media data, rules that are used to determine whether the object should be obfuscated in that media data may make such a determination based on a role of the object with respect to that media data.

In some embodiments, the media obfuscation platform may identify a set of objects that are not to be obfuscated in relation to a piece of media data. During an obfuscation process, object recognition may be performed to identify a number of different objects depicted within the media data of a particular type (e.g., people). In these embodiments, characteristics of each of the identified objects may be compared to corresponding characteristics of the objects in the set of objects. If a match is identified between the characteristics of an identified object and the characteristics of at least one object in the set of objects, then no obfuscation is applied to that object. Otherwise, if a match is not identified between the characteristics of an identified object and the characteristics of at least one object in the set of objects, then an obfuscation effect (e.g., a blurring effect) may automatically be applied to that object.

Figure 5:
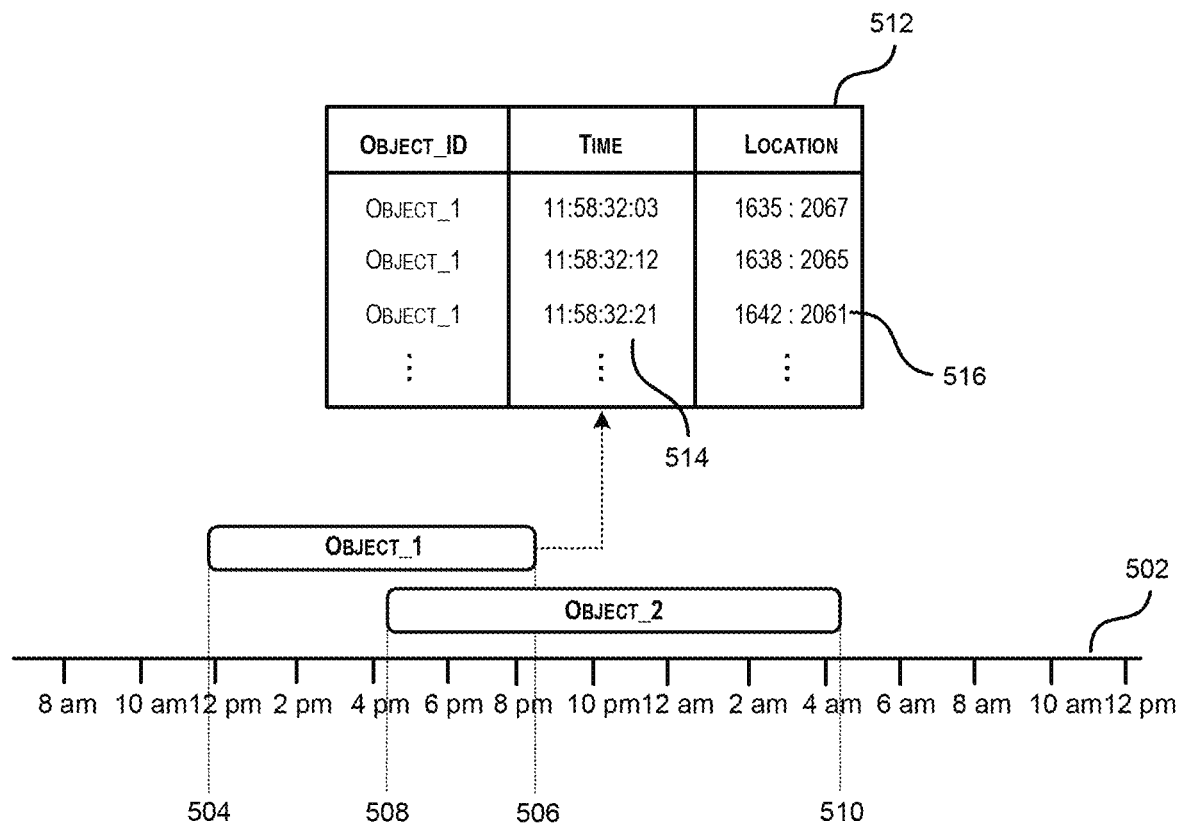
FIG. 5 depicts an illustrative example of a mapping of objects to a media data in accordance with at least some embodiments

FIG. 5 depicts an illustrative example of a mapping of objects to a media data in accordance with at least some embodiments. In some embodiments, a timeline 502 may be maintained with respect to a media data. A number of objects (e.g., Object_1 and Object_2) may be mapped to that timeline. For example, each object may be associated with at least a beginning point in time and an ending point in time. In this example, the beginning point in time may correspond to a point on the timeline at which the respective object is first determined to be depicted within the media data and the ending point in time may correspond to a point on the timeline at which the respective object is last determined to be depicted within the media data. Each object may be associated with a different beginning point in time and ending point in time. For example, Object_1 may be associated with a beginning point in time 504 and an ending point in time 506 whereas Object_2 may be associated with a beginning point in time 508 and an ending point in time 510.

In some embodiments, a mapping 512 may be maintained with respect to the media data that stores information about one or more objects identified within that media data. In some embodiments, the mapping may include a series of times 514 and corresponding locations 516 of an object at the respective times.

The series of times 514 may include any suitable indication of a position within a timeline associated with the media data. In some embodiments, a time within the series of times 514 may be representative of a particular point in time (e.g., a timestamp) that corresponds to the timeline 502 associated with the media data. In some embodiments, a time within the series of times 514 may be representative of a particular frame within a video.

The locations 516 may include any suitable indication of a position within the content of the media. In the case of a video (i.e., a series of images) or still image, the location may be representative of horizontal (e.g., X-axis) and vertical (e.g., Y-axis) coordinates of the object as identified within an image. In some embodiments, the location may be representative of a particular pixel or set of pixels within an image.

In some embodiments, the mapping 512 may be used by an object obfuscation engine (e.g., object obfuscation engine 110 of FIG. 1) during an obfuscation process. To do this, the object obfuscation engine may generate an obfuscation effect of a size roughly corresponding to that of the object to be obfuscated. The obfuscation effect is then positioned at each of the locations 516 within the media data during each of the respective times in the series of times 514, causing the portion of the media data at the respective position to be obfuscated.

Figure 6:
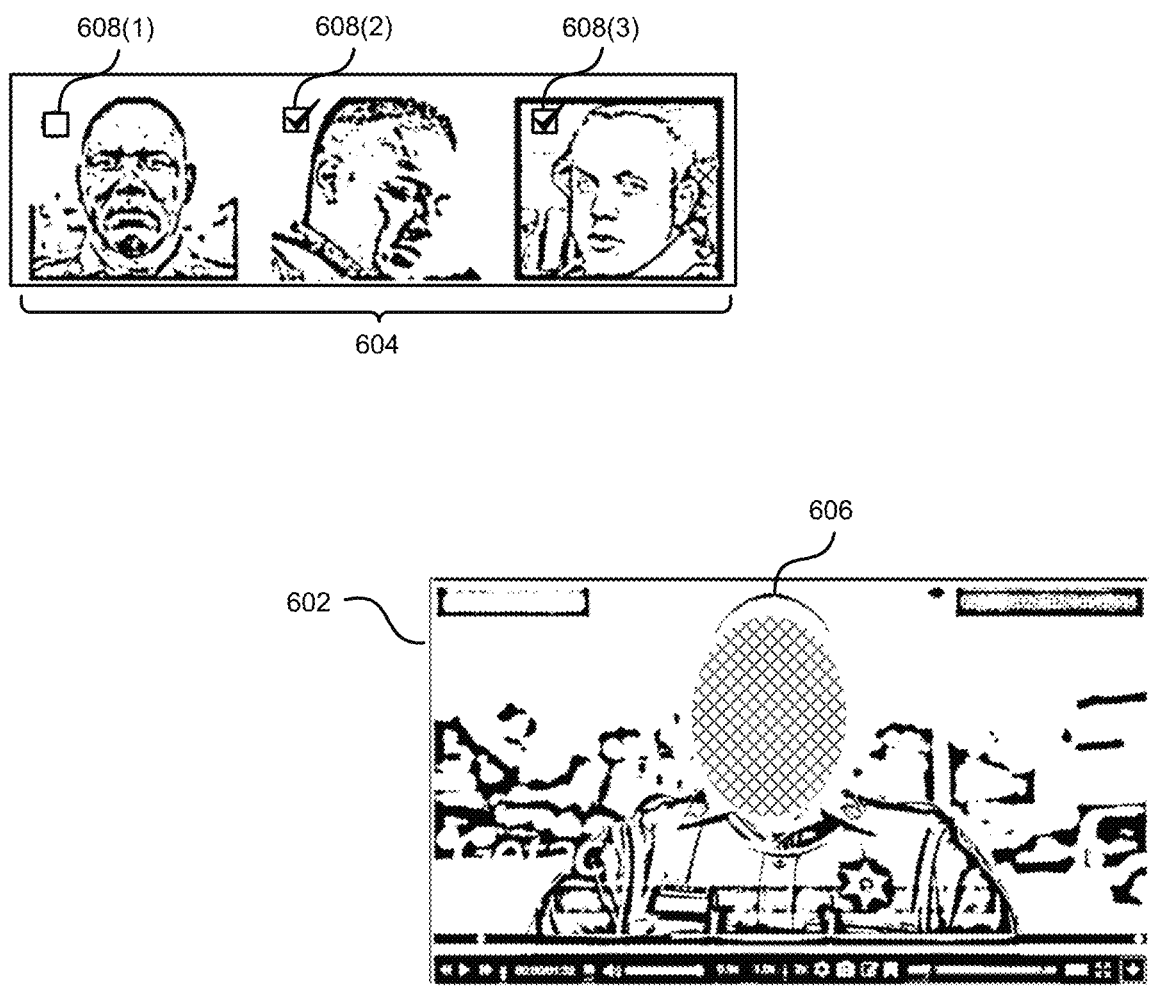
FIG. 6 depicts an illustrative example of various elements of a graphical user interface (GUI) that may be implemented in accordance with at least some embodiments.

FIG. 6 depicts an illustrative example of various elements of a graphical user interface (GUI) that may be implemented in accordance with at least some embodiments. Such a GUI may be instantiated upon execution of a software application in communication with the media obfuscation platform.

In some embodiments, a GUI may include a media player element 602 that enables consumption (e.g., viewing) of the media data. In some cases, the media player element may provide the ability for a user (e.g., an administrator) to view either an obfuscated version of the media data or an unobfuscated version of the media data. For example, the user may be provided an illustrative example of an obfuscation effect 606 that may be applied to the media data. In some embodiments, the user may be given the ability to change a location or size of the obfuscation effect in order to more effectively obfuscate an object. In some cases, the user may be provided with the ability to manually add an obfuscation effect at a specified location or locations. The user may be further provided with the ability to move the obfuscation effect within the media data with respect to time.

In some embodiments, the GUI may further include an object selection element 604. An object selection element may provide a user with an indication of each of the objects that have been identified within the media data. In some embodiments, each object may be identified via an identifier associated with that object. In some embodiments, each object may be identified via a graphical representation of the object, such as a thumbnail image. In some embodiments, the indication of each of the objects identified within the media data may include one or more selectors 608 (1-3) that can be selected by a user to indicate to the media obfuscation platform that the object associated with that selector should be obfuscated. In some embodiments, a user may make a selection as to which objects should be obfuscated. In some embodiments, a user may make a selection as to which objects should not be obfuscated and a determination may be made to obfuscate all non-selected objects.

Figure 7:
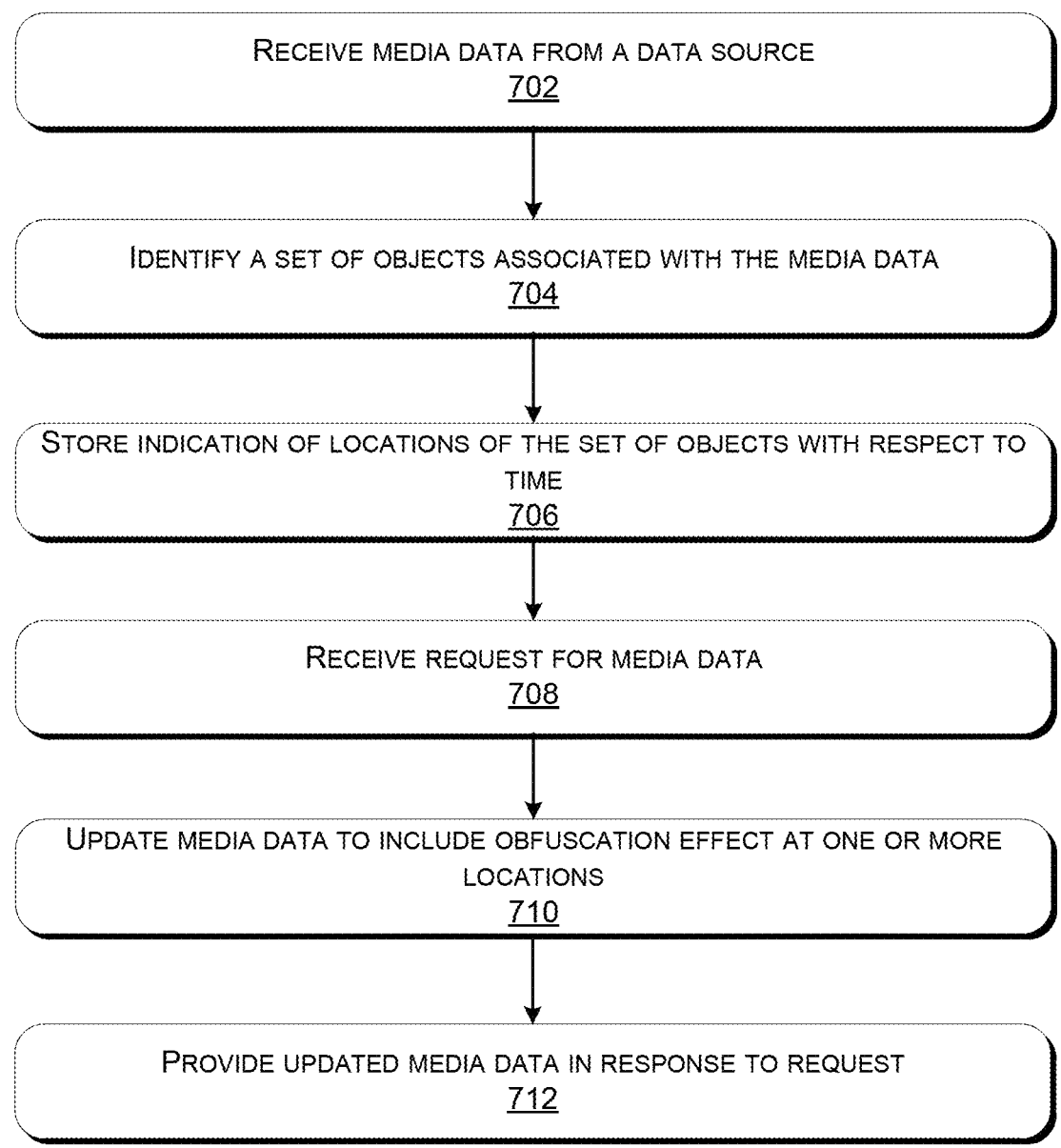
FIG. 7 depicts a block diagram showing an example process flow for automatically identifying and obfuscation objects in a media data in accordance with embodiments.

FIG. 7 depicts a block diagram showing an example process flow for automatically identifying and obfuscation objects in a media data in accordance with embodiments. The process 700 may be performed by components within a system 100 as discussed with respect to FIG. 1 above. For example, the process 700 may be performed by a media obfuscation platform 102 in communication with a number of data sources 106, and one or more third-party devices 108.

At 702, the process 700 comprises receiving media data from a data source. In some embodiments, the media data comprises one or more of audio data, video data, or image data. The data source may comprise any suitable electronic device capable of capturing media data in relation to an environment in which the data source is located. In some non-limiting examples, the data source comprises at least one of a street camera, body-mounted camera, or vehicle-mounted camera.

At 704, the process 700 comprises identifying a set of objects associated with the media data. In some embodiments, this comprises performing one or more object recognition (e.g., pattern recognition) techniques on the media data. In some embodiments, the set of objects may comprise a set of persons or items having personally-identifiable information. For example, a set of objects may include depictions of drivers' licenses, vehicle license plates, addresses, or any other identifying items.

At 706, the process 700 comprises storing information about the identified objects. Such information may include an indication of times and corresponding locations at which the object is detected within the media data. In some embodiments, the indication of times at which the object is detected within the media data comprises a timestamp. In some embodiments, the indication of times at which the object is detected within the media data comprises an indication of a video frame. In some embodiments, the indication of locations at which the object is detected within the media data comprises an indication of a pixel within an image. In some embodiments, the indication of locations at which the object is detected within the media data comprises horizontal and vertical coordinates.

At 708, the process 700 comprises receiving a request for the media data. In some embodiments, such a request may be a FOIA request that relates to information about a particular event or events. In some embodiments, the request specifies an event and the media data is determined to be associated with the event. For example, the event may correspond to a request for emergency services made via a phone call.

At 710, the process 700 comprises updating the media data to include an obfuscation effect at one or more times and corresponding locations associated with an object depicted within the media data. To do this, the process may further comprise determining, for each of the object in the set of objects, whether to apply the obfuscation effect. In some cases, a determination as to whether to apply the obfuscation effect to an object in the set of objects is made based at least in part on a role of an entity from which the request was received. In some cases, a determination as to whether to apply the obfuscation effect to an object in the set of objects is made based at least in part on a role of the object with respect to the media data.

At 712, the process 700 comprises providing the updated media data to the requesting entity in response to the request. In some embodiments, providing the updated media data in response to the request comprises providing a set of data files for download. In some embodiments, providing the updated media data in response to the request comprises providing a link to a location in memory (e.g., a Uniform Resource Locator (URL) link) at which the updated media data may be accessed.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed is:

1. A method comprising:
   receiving, from a data source, media data comprising a depiction of a number of objects;
   identifying, within the media data, a set of objects associated with the media data;
   storing an indication of one or more locations of the objects in the set of objects within the media data with respect to time;
   receiving a request for the media data from a requesting entity;
   determining, via an obfuscation rule, at least one specific object to be automatically obfuscated from the media data based at least in part on a role of the requesting entity from which the request was received;
   updating the media data by applying an obfuscation effect to at least one location of the one or more locations within the media data that corresponds to the at least one specific object with respect to time; and
   providing the updated media data in response to the request.

2. The method of claim 1, wherein the media data comprises one or more of audio data, video data, or image data.

3. The method of claim 1, wherein the indication of one or more locations of the objects in the set of objects comprises an indication of a pixel within an image.

4. The method of claim 3, wherein the indication of one or more locations of the objects in the set of objects comprises horizontal and vertical coordinates.

5. The method of claim 3, wherein the indication of one or more locations of the objects in the set of objects is associated with a timestamp.

6. The method of claim 1, wherein the indication of one or more locations of the objects in the set of objects is associated with a video frame.

7. The method of claim 1, wherein the data source comprises at least one of a street camera, body-mounted camera, or vehicle-mounted camera.

8. The method of claim 1, further comprising determining, for each of the object in the set of objects, whether to apply an additional obfuscation effect.

9. The method of claim 8, wherein determining whether to apply the obfuscation effect to an object in the set of objects is based at least in part on a role of the object with respect to the media data.

10. The method of claim 1, wherein the role of the requesting entity is a member of the public, and wherein the at least one specific object includes an object that is identified in the media data as a victim or a bystander associated with an event.

11. A computing device comprising:
  a processor; and
  a memory including instructions that, when executed with the processor, cause the computing device to, at least:
    receive, from a data source, media data comprising a depiction of a number of objects;
    identify, within the media data, a set of objects associated with the media data;
    store an indication of one or more locations of the objects in the set of objects within the media data with respect to time;
    receive a request for the media data from a requesting entity;
    determine, via an obfuscation rule, at least one specific object to be automatically obfuscated from the media data based at least in part on a role of the requesting entity from which the request was received;
    update the media data by applying an obfuscation effect to at least one location of the one or more locations within the media data that corresponds to the at least one specific object with respect to time; and
    provide the updated media data in response to the request.

12. The computing device of claim 11, wherein the request specifies an event and the media data is determined to be associated with the event.

13. The computing device of claim 12, wherein the event is a request for emergency services.

14. The computing device of claim 11, wherein the set of objects comprises a set of persons or items having personally-identifiable information.

15. The computing device of claim 11, wherein providing the updated media data in response to the request comprises providing a set of data files for download.

16. The computing device of claim 11, wherein providing the updated media data in response to the request comprises providing a link to a location in memory of the set of media.

17. The computing device of claim 11, wherein the request relates to an event associated with a request for emergency services.

18. A non-transitory computer-readable media collectively storing computer-executable instructions that upon execution cause one or more computing devices to collectively perform acts comprising:
  receiving, from a data source, a media data comprising a depiction of a number of objects;
  identifying, within the media data, a set of objects associated with the media data;
  storing an indication of one or more locations of the objects in the set of objects within the media data with respect to time;
  receiving a request for the media data from a requesting entity;
  determining, via an obfuscation rule, at least one specific object to be automatically obfuscated from the media data based at least in part on a role of the requesting entity from which the request was received;
  updating the media data by applying an obfuscation effect to at least one location of the one or more locations within the media data that corresponds to the at least one specific object with respect to time; and
  providing the updated media data in response to the request.

19. The non-transitory computer-readable media of claim 18, wherein the indication of one or more locations of the objects in the set of objects comprises one of an indication of a pixel within an image or horizontal and vertical coordinates.

20. The non-transitory computer-readable media of claim 18, wherein the indication of one or more locations of the objects in the set of objects comprises at least one of a timestamp or a video frame.

* * * * *